(12) United States Patent  
Niwa et al.

(10) Patent No.: US 8,028,801 B2  
(45) Date of Patent: Oct. 4, 2011

(54) SOUNDPROOF COVER

(75) Inventors: Takahiro Niwa, Tokyo (JP); Michihiro Inagaki, Tokyo (JP); Akinao Hiraoka, Tokyo (JP); Motonori Kondoh, Tokyo (JP); Tadashi Mori, Tokyo (JP)

(73) Assignee: Nichias Corporation, Tokyo (JP)

( * ) Notice: Subject to any disclaimer, the term of this patent is extended or adjusted under 35 U.S.C. 154(b) by 172 days.

(21) Appl. No.: 12/057,584

(22) Filed: Mar. 28, 2008

(65) Prior Publication Data  
US 2008/0236936 A1   Oct. 2, 2008

(30) Foreign Application Priority Data  
Mar. 30, 2007   (JP) ................................. 2007-094858

(51) Int. Cl.  
*E04B 1/82*  (2006.01)

(52) U.S. Cl. ......... 181/290; 181/200; 181/210; 181/284

(58) Field of Classification Search .................. 181/200, 181/210, 290, 284  
See application file for complete search history.

(56) References Cited

U.S. PATENT DOCUMENTS

| 4,828,910 | A | 5/1989 | Haussling | |
|---|---|---|---|---|
| 6,817,441 | B2 * | 11/2004 | Murakami et al. | 181/204 |
| 7,065,963 | B2 * | 6/2006 | Niwa | 60/323 |
| 7,267,196 | B2 * | 9/2007 | Mathur | 181/208 |
| 2002/0160682 | A1 | 10/2002 | Zeng et al. | |
| 2005/0274569 | A1 * | 12/2005 | Seel | 181/202 |
| 2006/0269724 | A1 * | 11/2006 | Ohashi et al. | 428/143 |

FOREIGN PATENT DOCUMENTS

| CN | 1414915 | 4/2003 |
|---|---|---|
| DE | 28 17 580 A1 | 11/1978 |
| JP | 2002-264736 | 9/2002 |
| JP | 2002-347535 | 12/2002 |
| JP | 2003-254081 | 9/2003 |
| JP | 2006-98966 | 4/2006 |
| WO | WO 01/49531 A | 7/2001 |

* cited by examiner

*Primary Examiner* — Forrest M Phillips  
(74) *Attorney, Agent, or Firm* — Nixon & Vanderhye P.C.

(57) ABSTRACT

The present invention provides a soundproof cover comprising: a sound-absorbing material having air permeability; and a skin material impregnated with a viscoelastic material and having air permeability, wherein the skin material is provided on a surface of the sound-absorbing material opposite to a sound source, and wherein the soundproof cover has a three-dimensional shape corresponding to an outer shape of the sound source.

6 Claims, 2 Drawing Sheets

SOUNDPROOF COVER

FIELD OF THE INVENTION

The present invention relates to a soundproof cover reducing a noise level against noise sources such as an automobile engine, a transmission, an industrial motor and a converter, in particular, noise sources emitting both of loud air radiated sounds and solid-borne sounds.

BACKGROUND OF THE INVENTION

There are a large number of sound sources in an automobile. From the viewpoint of a demand for quietness from noise in inside and outside of a car, various soundproof measures have been taken. In particular, with regard to components (sound sources) that generate loud sounds, such as an engine, a transmission, and a driving system, drastic soundproof measures are required in positions near to the sound sources. Thus, a dedicated soundproof component called a soundproof cover is used. In the case of conventional soundproof covers, highly rigid covers formed by molding a metal, a polyamide, polypropylene, or the like are used as sound-insulating materials and direct noises emitted from the sound sources are insulated by the rigid covers according to the mass law. Moreover, in the case of the rigid covers, since inner reverberating sounds (standing waves) generated by reflection of sounds between the sound sources and the covers increase, as measures thereto, the covers have a structure where a sound-absorbing material is post-attached to the inner surface of the covers or a part thereof facing the sound sources (see, e.g., Patent Documents 1 and 2). However, in these soundproof covers, since the above sound sources frequently possess solid-borne sounds (vibration) in combination, in order to prevent the rigid covers from becoming a new sound source (secondary emission), it is necessary to provide a gap between the covers and the sound sources usually through intervention of a vibration-insulating material such as rubber bush so that the rigid covers may not come into contact with the sound sources. However, there are problems such that the standing waves are leaked from the gap to thereby increase a noise level and thus an expected soundproof effect is not obtained.

In additions since it is difficult to provide a sufficient thickness of a lining sound-absorbing material in a highly concentrated space such as inside of an engine room, the above soundproof cover composed of the rigid cover and the lining sound-absorbing material results in an insufficient effect of reducing sounds. Furthermore, the secondary radiated sounds reflected at the cover inner surfaces repeatedly reflect diffusely between the soundproof cover and the sound source intricately to finally cause a phenomenon of emitting a greater sound that is collected from the narrow gap between the cover edge and the sound source in some cases. Particularly, in the case of the soundproof cover having a large and deep R shape, there arises a case where a reflected sound collected by the principle of parabolic antenna is collected at the cover edge and reflected and thus the mounting of the soundproof cover worsens the noise level. However, since the thickness of the lining sound-absorbing material to be used is limited owing to the clearance between the soundproof cover and the sound source, it is difficult to take measures thereto.

Patent Document 1: JP-A-2003-254081
Patent Document 2: JP-A-2002-347535

SUMMARY OF THE INVENTION

Thus, an object of the invention is to provide a soundproof cover having an excellent sound-insulating performance and an effect of reducing a standing wave between the cover inner surface and a sound source and capable of being easily molded into a three-dimensional shape by a production means such as hot-press molding.

In order to achieve the above object, the invention provides the following soundproof cover.

(1) A soundproof cover comprising:
a sound-absorbing material having air permeability; and
a skin material impregnated with a viscoelastic material and having air permeability,
wherein the skin material is provided on a surface of the sound-absorbing material opposite to a sound source, and
wherein the soundproof cover has a three-dimensional shape corresponding to an outer shape of the sound source.

(2) The soundproof cover according to the above (1), which has a thin flat part comprising a lamination of the sound-absorbing material and the skin material and being formed over a predetermined width of the outer circumference thereof.

(3) The soundproof cover according to the above (1) or (2), wherein the sound-absorbing material comprises a porous felt, a communicating resin foam, a communicating rubber foam, or an inorganic short fiber integrated body.

(4) The soundproof cover according to any one of the above (1) to (3), wherein the skin material comprises a woven fabric or a nonwoven fabric.

(5) The soundproof cover according to any one of the above (1) to (4), which is for automobiles or for industrial machines.

Since the soundproof cover of the invention does not possess a rigid cover, there arises no reflection of sounds between the cover and sound sources and hence an effect of reducing standing waves is excellent as well as sound leakage from the cover edge is also reduced, so that it becomes possible to reduce a noise level in all directions. Furthermore, it is not necessary to bond a rigid cover to a sound-absorbing material and the soundproof cover can be produced merely through molding, so that productivity is also excellent.

Figure 1:
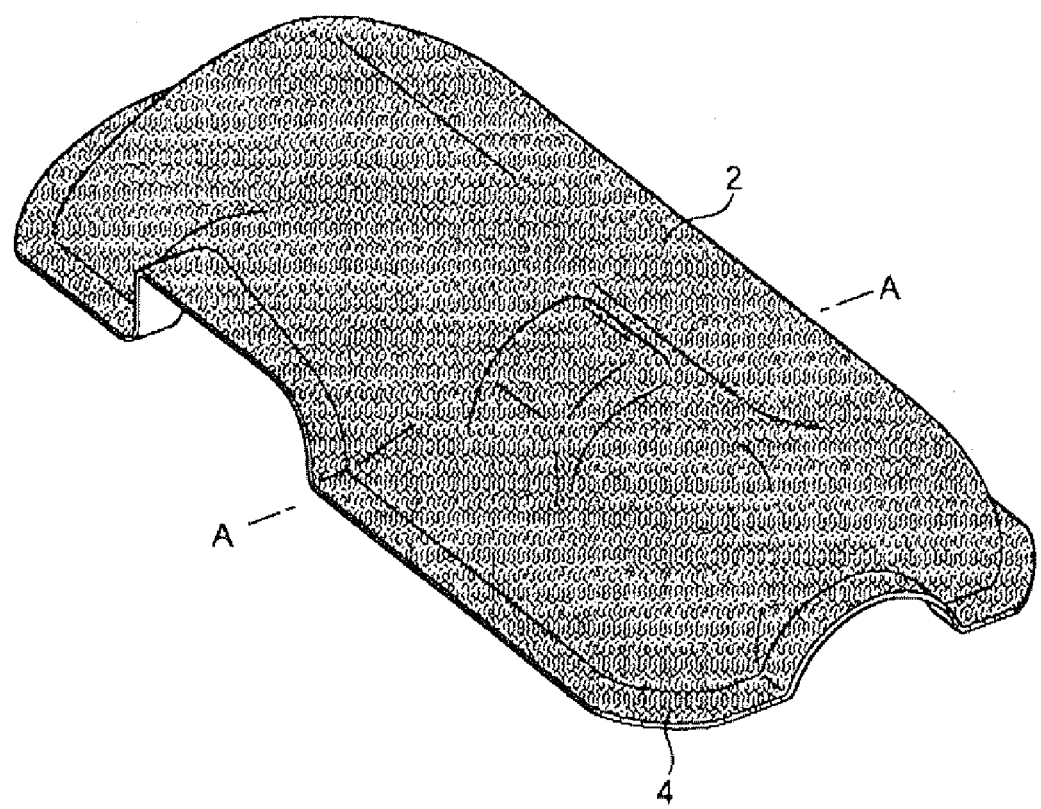
FIG. 1 is a perspective view illustrating one example of the soundproof cover of the invention.

The reference numerals used in the drawings denote the following, respectively.
1: Air-permeable sound-absorbing material
2: Air-permeable skin material
3: Inner surface
4: Circumferential rim part

DETAILED DESCRIPTION OF THE INVENTION

Figure 2:
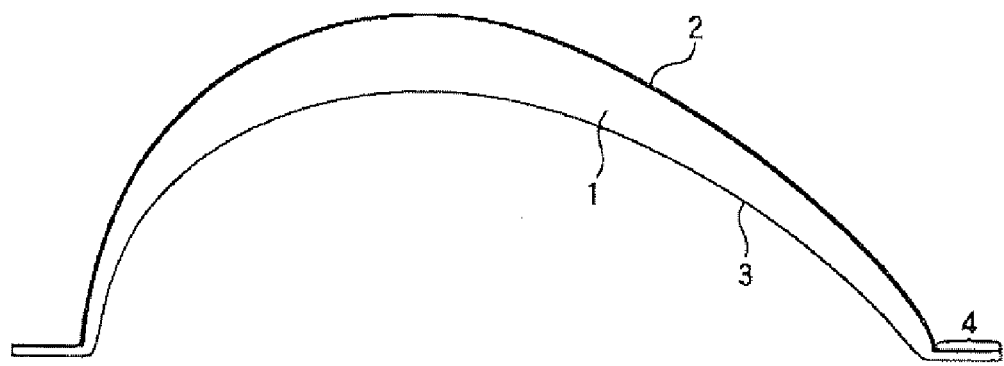
FIG. 2 is an AA cross-sectional view of FIG. 1.

The following will describe the invention in detail.
The soundproof cover of the invention is a soundproof cover wherein a laminate formed by attaching a skin material 2 containing a viscoelastic material applied thereto in advance and having air permeability to a surface (a surface opposite to a sound source) of a sound-absorbing material 1 having air permeability is molded into a three-dimensional shape according to an outer shape of a sound source such as an engine as shown in FIG. 1 as a perspective view and FIG. 2 as the AA cross-sectional view.

The sound-absorbing material 1 is not particularly limited so far as it has air permeability and soundproof performance but, from the viewpoint of moldability into a three-dimensional shape, (1) thermoplastic organic fibers such as polyethylene-terephthalate fibers, polypropylene fibers, polyethylene fibers, and polyamide fibers, (2) thermoplastic resin foams such as polyethylene foams and polypropylene foams, (3) low density resin foams such as polyurethane foams, phenol foams, and melamine foams, (4) relatively high density rubber foams such as NBR foams and EPDM foams, and (5) highly thermally resistant organic fibers such as aramid fibers, inorganic short fibers such as glass wool, rock wool, and ceramic wool are preferred in this order. In the case of the above (1) and (2), the skin material layer and the sound-absorbing material layer are more strongly integrated at hot-press molding and in the cases of the above (3) and (4), the skin material layer and the sound-absorbing material layer are more strongly integrated through a resin coated on the skin material but the freedom of the strength and the molding conditions is slightly inferior as compared with the cases of (1) and (2). In the case of the above (5), since an anti-scattering treatment is necessary, the case is disadvantageous in cost.

Of these, those having a basis weight of 200 g/cm² to 2,000 g/cm² are preferred, and those having a basis weight of 500 g/cm² to 1,500 g/cm² are more preferred.

In addition, as the sound-absorbing material 1, air permeable resin foams such as urethane foams, phenol foams, melamine foams, polypropylene foams, and polyethylene foams can be also used. Of these, those having a density of 0.009 g/cm³ to 0.1 g/cm³ are preferred, and these having a density of 0.025 g/cm³ to 0.1 g/cm³ are more preferred.

Moreover, as the sound-absorbing material 1, communicating rubber foams such as NBR foams and EPDM foams can be also used. Of these, those having a density of 0.1 g/cm² to 0.2 g/cm³ are preferred, and those having a density of 0.15 g/cm³ to 0.2 g/cm³ are more preferred.

Furthermore, integrated bodies of inorganic short fibers such as glass wool, rock wool, and ceramic wool can be also used. Of these, those having a density of 0.05 g/cm³ to 0.4 g/cm³ are preferred, and those having a density of 0.08 g/cm³ to 0.25 g/cm³ are more preferred.

In addition, the inner surface 3 to be a sound source side of the sound-absorbing material 1 may be covered with a nonwoven fabric or woven fabric, preferably a nonwoven fabric or woven fabric having an air permeation amount of preferably 100 cc/cm²×sec or more, more preferably 300 cc/cm²×sec or more or a porous coating film formed by binding a scale-like clay mineral such as foam vermiculite pieces or muscovite or biotite with a binder.

As the skin material 2, there can be employed a nonwoven fabric made of an organic or inorganic fiber, e.g., a synthetic resin fiber such as a polyester fiber or a polypropylene fiber, a natural fiber such as a pulp fiber or a kanaf fiber, a glass fiber, metal fiber, a ceramic fiber, a carbon fiber, or the like using a production method such as a spun-bonding method, a needle-punching method, a thermal bonding method, a chemical bonding method, or a stitch bonding method, or a woven fabric made of any of the above fibers. Of these, those having a basis weight of 50 g/cm² to 600 g/cm² are preferred, and those having a basis weight of 150 g/cm² to 400 g/cm² are more preferred. The soundproof cover of the invention is obtained by a method of hot press molding or three-dimensional processing using sewing or an adhesive as mentioned below. In the case of formation by hot press molding, when the basis weight is less than 50 g/cm², the cover tends to be broken when squeezed at hot press molding. When the basis weight is more than 600 g/cm², the cover tends to be wrinkled at hot press molding.

A viscoelastic material for adhesion to the sound-absorbing material 1 and for imparting damping property is applied onto the skin material 2. As the viscoelastic material, a resin having damping property, such as a vinyl acetate resin, a vinyl acetate-ethylene copolymer resin, an acrylic resin, an acrylonitrile-styrene-butadiene copolymer resin, a silicone resin, or a moisture-curable urethane resin is suitable. The air permeation amount of the skin material 2 onto which the viscoelastic material has been applied is preferably from 0 cc/cm²×sec to 10 cc/cm²×sec, more preferably from 0.01 cc/cm²×sec to 5 cc/cm²×sec. In order to form such a skin material 2, the application amount of the viscoelastic material is preferably from 100 g/cm² to 600 g/cm², more preferably from 200 g/cm² to 600 g/cm². When the application amount is less than 100 g/cm², adhesive force is insufficient and also the air permeation amount does not fall within the above range, while when the application amount is more than 600 g/cm², a thick film made of the viscoelastic material is formed on the surface of the soundproof cover and acts similarly to a conventional rigid cover, which results in increase of the level of the inner reverberating sound.

The method for applying the viscoelastic material is not particularly limited and a means such as roller coating, spray coating, curtain coatings or impregnation may be selected depending on the type of the viscoelastic material.

In order to mold the above laminate of the sound-absorbing material 1 and the skin material 2, hot press molding is conducted using one pair of upper and lower molds that form a cavity corresponding to the outer shape of the sound source. At the hot press molding, by the action of the viscoelastic material applied to the skin material 2, the sound-absorbing material 1 and the skin material 2 adhere to each other and also the molded shape is kept. Therefore, as forming conditions, the temperature is sufficiently a curing temperature of the viscoelastic material or higher and the pressing pressure is suitably set depending on the thickness of the objective sound-absorbing material 1. Moreover, in order to provide the circumferential rim part 4 in an integrated fashion, a mold having a flat part formed at the circumference is employed.

Moreover, a shape-keeping effect is further enhanced by forming the circumferential rim part 4 in an integrated fashion though compression molding in a bead or flange form in a thickness of 0.5 mm to 3 mm at the circumference of the soundproof cover. Also, utilizing the circumferential rim part 4, the cover can be fixed to the sound source or a housing of the sound source with a bolt or a resin fastener.

The inner surface 3 of the soundproof cover of the invention is molded into a shape corresponding to the shape of the sound source and the cover can be mounted directly or close to the sound source. Thus, after the sound from the sound source is reduced by the sound-absorbing material 1 in a large extent, the sound is emitted outside through permeation of the skin material 2. Therefore, the soundproof cover has soundproof performance equal to or higher than the rigid cover without the reflection of the sound from the sound source between the sound source and the rigid cover like the case of using the rigid cover.

EXAMPLES

The present invention will be illustrated in greater detail with reference to the following Examples, but the invention should not be construed as being limited thereto.

Example 1

As a skin material, a vinyl acetate emulsion (Bond H1500N manufactured by Konishi Co., Ltd., an aqueous solution having a solid content of 50%) was roller-coated on a nonwoven fabric (220NI-SP manufactured by Nippon Non-Woven Fabrics Co., Ltd., basis weight: 220 g/m$^2$) and dried so as to form a coating of vinyl acetate in an amount of 400 g/m$^2$ as a solid matter, whereby a skin material having a thickness of 1 mm and a total basis weight of 620 g/m$^2$ was produced. When damping property of the skin material was measured by a dynamic viscoelasticity spectrometer, it was found that the material had a peak of loss modulus within the region of 20° C. to 80° C. Moreover, when sound-insulating performance was measured by a sound intensity (sound energy level) methods sound transmission loss (OA value between 100 Hz and 5 kHz) was about 21 dB. The value was larger than the sound transmission loss of a rigid sound-insulating material calculated from the mass law, about 18 dB, (the resin-made sound-insulating materials used in conventional products show similar values of sound transmission loss, which increase in accordance with increases in weight). Thus, a sound-insulating effect larger than the effect expected from the mass law was observed.

As a sound-absorbing material, a material formed by laminating two sheets of a felt made of a polyethylene terephthalate fiber as a raw material (F500-20T manufactured by Teijin Fibers Limited, basis weight: 500 g/m$^2$) (total basis weight: 1,000 g/m$^2$) was prepared. The above skin material was overlaid thereon and the laminate was subjected to hot press molding into a predetermined cover shape to manufacture a soundproof cover. The hot press conditions on this occasion were as follows: mold temperature was set at 190° C. at the outer surface side and at 170° C. at the inner surface side, pressing pressure was set at 120 tons (surface pressure: 500 t/m$^2$), and pressing time was 30 sec. The molding was conducted using a mold designed so that a circumferential rim having a width of 5 mm and a thickness of 1 mm was formed in the entire circumference of parting line of the facing surface of upper and lower molds.

Figure 3:
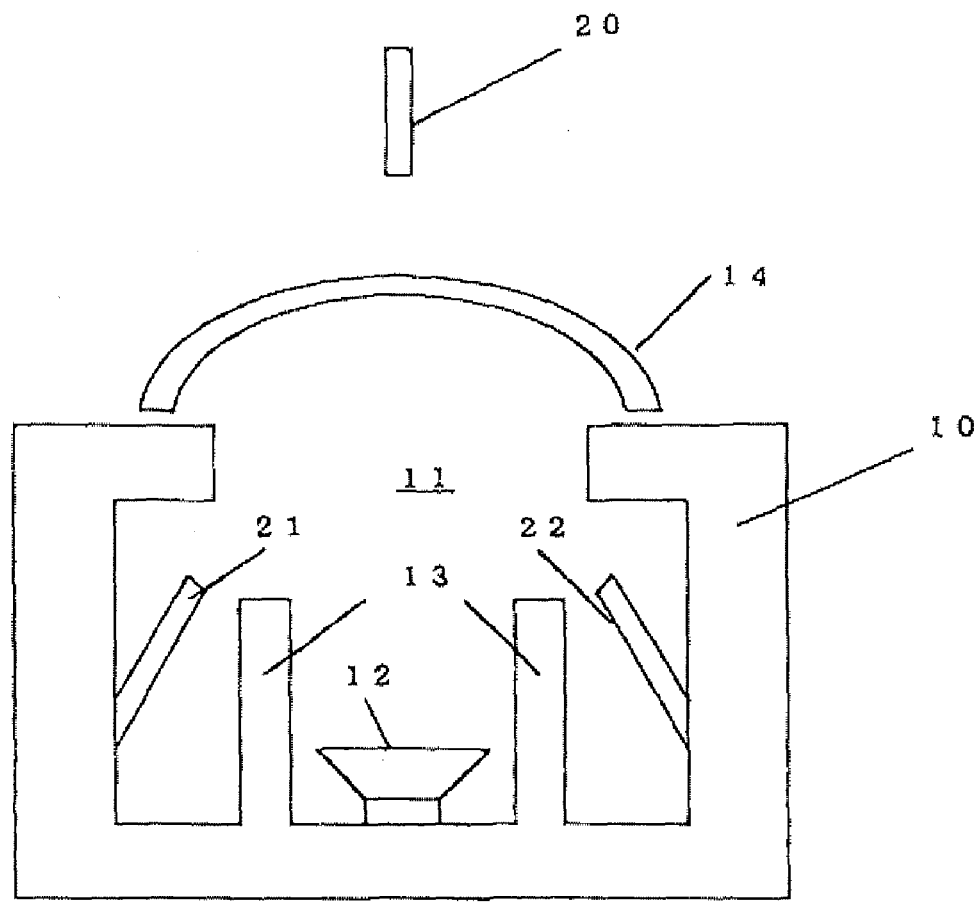
FIG. 3 is a schematic view illustrating an acoustic measurement device used in Examples.

The soundproof performance was evaluated for the soundproof cover using a testing device shown in FIG. 3. The testing device shown in the figure has a structure where a speaker 12 is disposed on the bottom part of a soundproof box 10 having an opening 11 at its upper face, the speaker 12 is further surrounded by a sound-insulating wall 13, and thereby, a sound from the speaker 12 is radiated toward a soundproof cover 14 disposed so as to cover the opening 11. Additionally, a sound level meter 20 is disposed above the soundproof cover 14 and measures a sound level of a transmitting sound (transmitted sound). Moreover, sound level meters 21, 22 are also disposed outside the sound-insulating wall 13 and measure a sound level of a sound reflected at the inner surface of the soundproof cover 14 (reflected sound).

The measurement was performed with adjusting the speaker sound level so as to be a transmitted sound of 100 dB and a reflected sound of 90 dB when the soundproof cover is not disposed. As a result, the transmitted sound was found to be 75 dB and the reflected sound was found to be 90 dB.

Example 2

As a skin material, a moisture-curable urethane hot-melt resin (ARX-1288 manufactured by Nitta Gelatin Inc.) was roller-coated on a nonwoven fabric (220NI-SP manufactured by Nippon Non-Woven Fabrics Co., Ltd., basis weight: 220 g/m$^2$) and cured under moisturization so as to form a coating of the urethane resin in an amount of 250 g/m$^2$ as a solid matter, whereby a skin material having a thickness of 1 mm and a total basis weight of 470 g/m$^2$ was manufactured. When damping property of the skin material was measured by a dynamic viscoelasticity spectrometer, it was found that the material had a peak of loss modulus within the region of 30° C. to 70° C. Moreover, when sound-insulating performance was measured by a sound intensity (sound energy level) method, sound transmission loss (OA value between 100 Hz and 5 kHz) was about 26 dB. The value was larger than the sound transmission loss of a rigid sound-insulating material calculated from the mass law, about 16 dB, (the resin-made sound-insulating materials used in conventional products show similar values of sound transmission loss, which increase in accordance with increases in weight). Thus, a sound-insulating effect larger than the effect expected from the mass law was observed.

Using the same sound-absorbing material as used in Example 1, molding was conducted under the same molding conditions to manufacture a soundproof cover.

When the soundproof performance of the soundproof cover was evaluated using a testing device shown in FIG. 3, the transmitted sound was found to be 73 dB and the reflected sound was found to be 89 dB.

Example 3

A soundproof cover was manufactured in the same manner as in Example 2 except that the basis weight of the sound-absorbing material was changed to 500 g/m$^2$. When the soundproof performance of the soundproof cover was evaluated using a testing device shown in FIG. 3, the transmitted sound was found to be 78 dB and the reflected sound was found to be 90 dB.

Example 4

A soundproof cover was manufactured in the same manner as in Example 2 except that the basis weight of the sound-absorbing material was changed to 1,500 g/m$^2$. When the soundproof performance of the soundproof cover was evaluated using a testing device shown in FIG. 3, the transmitted sound was found to be 72 dB and the reflected sound was found to be 94 dB.

Example 5

A soundproof cover was manufactured in the same manner as in Example 2 except that the basis weight of the sound-absorbing material was changed to 2,000 g/m$^2$ and that the thickness of the circumferential rim was changed to 3 mm. When the soundproof performance of the soundproof cover was evaluated using a testing device shown in FIG. 3, the transmitted sound was found to be 70 dB and the reflected sound was found to be 98 dB.

Example 6

A soundproof cover was manufactured in the same manner as in Example 2 except that the sound-absorbing material was changed to a urethane foam and the basis weight of the sound-absorbing material was changed to 250 g/m$^2$. When the soundproof performance of the soundproof cover was evaluated using a testing device shown in FIG. 3, the transmitted sound was found to be 82 dB and the reflected sound was found to be 91 dB.

Example 7

A soundproof cover was manufactured in the same manner as in Example 6 except that the basis weight of the sound-absorbing material was changed to 500 g/m$^2$. When the soundproof performance of the soundproof cover was evaluated using a testing device shown in FIG. 3, the transmitted sound was found to be 80 dB and the reflected sound was found to be 92 dB.

Example 8

A soundproof cover was manufactured in the same manner as in Example 2 except that the sound-absorbing material was changed to an EPDM foam and the basis weight of the sound-absorbing material was changed to 900 g/m$^2$, and that the thickness of the circumferential rim was changed to 2 mm. When the soundproof performance of the soundproof cover was evaluated using a testing device shown in FIG. 3, the transmitted sound was found to be 74 dB and the reflected sound was found to be 95 dB.

Example 9

A soundproof cover was manufactured in the same manner as in Example 8 except that the basis weight of the sound-absorbing material was changed to 1,200 g/m$^2$. When the soundproof performance of the soundproof cover was evaluated using a testing device shown in FIG. 3, the transmitted sound was found to be 73 dB and the reflected sound was found to be 95 dB.

Example 10

A soundproof cover was manufactured in the same manner as in Example 1 except that the basis weight of the skin material was changed to 50 g/m$^2$. When the soundproof performance of the soundproof cover was evaluated using a testing device shown in FIG. 3, the transmitted sound was found to be 88 dB and the reflected sound was found to be 91 dB.

Example 11

A soundproof cover was manufactured in the same manner as in Example 1 except that the basis weight of the skin material was changed to 600 g/m$^2$. When the soundproof performance of the soundproof cover was evaluated using a testing device shown in FIG. 3, the transmitted sound was found to be 82 dB and the reflected sound was found to be 93 dB.

Example 12

A soundproof cover was manufactured in the same manner as in Example 1 except that the coating amount of the viscoelastic material was changed to 100 g/m$^2$. When the soundproof performance of the soundproof cover was evaluated using a testing device shown in FIG. 3, the transmitted sound was found to be 92 dB and the reflected sound was found to be 87 dB.

Example 13

A soundproof cover was manufactured in the same manner as in Example 2 except that the basis weight of the sound-absorbing material was changed to 200 g/m$^2$. When the soundproof performance of the soundproof cover was evaluated using a testing device shown in FIG. 3, the transmitted sound was found to be 76 dB and the reflected sound was found to be 90 dB.

Comparative Example 1

The same sound-absorbing material as used in Example 1 was adhered to a rigid cover made of a polyamide to manufacture a soundproof cover.

When the soundproof performance of the soundproof cover was evaluated using a testing device shown in FIG. 3, the transmitted sound was found to be 72 dB and the reflected sound was found to be 104 dB.

Comparative Example 2

A soundproof cover was manufactured in the same manner as in Example 1 except that the basis weight of the nonwoven fabric made of the polyester of the skin material was changed to 45 g/m$^2$. However, a part of the skin material was broken and thus the evaluation of the soundproof performance was not conducted.

Comparative Example 3

A soundproof cover was manufactured in the same manner as in Example 1 except that the basis weight of the nonwoven fabric made of the polyester of the skin material was changed to 650 g/m$^2$. However, a part of the skin material was wrinkled and thus the evaluation of the soundproof performance was not conducted.

Comparative Example 4

A soundproof cover was manufactured in the same manner as in Example 1 except that the coating amount of the vinyl acetate emulsion on the skin material was changed to 95 g/m$^2$ (solid matter).

When the soundproof performance of the soundproof cover was evaluated using a testing device shown in FIG. 3, the transmitted sound was found to be 95 dB and the reflected sound was found to be 87 dB.

Comparative Example 5

A soundproof cover was manufactured in the same manner as in Example 1 except that the coating amount of the vinyl acetate emulsion on the skin material was changed to 650 g/m$^2$ (solid matter). However, the sound-absorbing material was not adhered to the skin material and thus the evaluation of the soundproof performance was not conducted.

Comparative Example 6

A soundproof cover was manufactured in the same manner as in Example 2 except that the basis weight of the sound-absorbing material was changed to 190 g/m$^2$. However, the sound-absorbing material and the skin material were peeled off in part at the circumferential rim part and thus the evaluation of the soundproof performance was not conducted.

Comparative Example 7

A soundproof cover was manufactured in the same manner as in Example 2 except that the basis weight of the sound-absorbing material was changed to 2,100 g/m$^2$. However, a part of the skin material was wrinkled and thus the evaluation of the soundproof performance was not conducted.

The specifications and properties of the soundproof covers of Examples and Comparative Examples are shown in Tables 1 to 3. In the Tables, the symbols showing the ratings denote the following, respectively.

A: Good
B: Fair
C: Poor

TABLE 1

| Comparing items | | Example 1 | Example 2 | Example 3 | Example 4 | Example 5 | Example 6 | Example 7 |
|---|---|---|---|---|---|---|---|---|
| Skin material | Basis weight (g/m$^2$) | 220 | 220 | 220 | 220 | 220 | 220 | 220 |
| Viscoelastic material | Type | vinyl acetate | polyurethane | polyurethane | polyurethane | polyurethane | polyurethane | polyurethane |
| | Coating weight (g/m$^2$) | 400 | 250 | 250 | 250 | 250 | 250 | 250 |
| Air permeation amount of skin material (cc/cm × sec) | | 6 | 2 | 2 | 2 | 2 | 2 | 2 |
| Loss factor of skin material (tanδ)[1] | | 0.40 | 0.60 | 0.60 | 0.60 | 0.60 | 0.60 | 0.60 |
| Sound-absorbing material (PET) | Basis weight (g/m$^2$) | 1,000 | 1,000 | 500 | 1,500 | 2,000 | — | — |
| Sound-absorbing material (urethane foam) | Basis weight (g/m$^2$) | — | — | — | — | — | 250 | 500 |
| Sound-absorbing material (EPDM foam) | Basis weight (g/m$^2$) | — | — | — | — | — | — | — |
| Pressing conditions | Temperature (upper/lower °C.) | (190/170) | (190/170) | (190/170) | (190/170) | (190/170) | (190/170) | (190/170) |
| | Pressure (Ion) | 120 | 120 | 120 | 120 | 120 | 120 | 120 |
| | Edge part thickness (mm) | 1 | 1 | 1 | 1 | 3 | 1 | 1 |
| | Moldability | A | A | A | A | B (wrinkle) | B (edge peel) | B (edge peel) |
| Strength at circumferential rim part (T-peel (N)) | | 20 | 20 | 20 | 20 | 18 | 7 | 9 |
| Area density (g/m$^2$) | | 1,620 | 1,470 | 970 | 1,970 | 2,470 | 720 | 970 |
| Soundproof performance | Transmitted sound[2] (dB) | 75 | 73 | 78 | 72 | 70 | 82 | 80 |
| | Reflected sound[3] (dB) | 90 | 89 | 90 | 94 | 98 | 91 | 92 |
| | Total[4] (dB) | 90 | 89 | 91 | 94 | 98 | 92 | 92 |
| Overall judgment | | A | A | A | A | B (moldability) | B (moldability) | B (moldability) |

TABLE 2

| Comparing items | | Example 8 | Example 9 | Example 10 | Example 11 | Example 12 | Example 13 |
|---|---|---|---|---|---|---|---|
| Skin material | Basis weight (g/m$^2$) | 220 | 220 | 50 | 600 | 220 | 220 |
| Viscoelastic material | Type | polyurethane | polyurethane | vinyl acetate | vinyl acetate | vinyl acetate | polyurethane |
| | Coating weight (g/m$^2$) | 250 | 250 | 400 | 400 | 100 | 250 |
| Air permeation amount of skin material (cc/cm × sec) | | 2 | 2 | 45 | 3 | 85 | 3 |
| Loss factor of skin material (tanδ)[1] | | 0.60 | 0.60 | 0.40 | 0.40 | 0.05 | 0.60 |
| Sound-absorbing material (PET) | Basis weight (g/m$^2$) | — | — | 1,000 | 1,000 | 1,000 | 200 |
| Sound-absorbing material (urethane foam) | Basis weight (g/m$^2$) | — | — | — | — | — | — |
| Sound-absorbing material (EPDM foam) | Basis weight (g/m$^2$) | 900 | 1,200 | — | — | — | — |
| Pressing conditions | Temperature (upper/lower °C.) | (190/170) | (190/170) | (190/170) | (190/170) | (190/170) | (190/170) |
| | Pressure (Ion) | 120 | 120 | 120 | 120 | 120 | 120 |
| | Edge part thickness (mm) | 2 | 2 | 1 | 1 | 1 | 1 |
| | Moldability | B (edge peel) | B (edge peel) | B (edge peel) | B (wrinkle) | A | B (edge peel) |
| Strength at circumferential rim part (T-peel (N)) | | 11 | 14 | 5 | 20 | 19 | 6 |
| Area density (g/m$^2$) | | 1,370 | 1,670 | 1,450 | 2,000 | 1,320 | 670 |
| Soundproof performance | Transmitted sound[2] (dB) | 74 | 73 | 88 | 82 | 92 | 76 |
| | Reflected sound[3] (dB) | 95 | 95 | 91 | 93 | 87 | 90 |
| | Total[4] (dB) | 95 | 95 | 93 | 93 | 93 | 90 |
| Overall judgment | | B (moldability) | B (moldability) | B (moldability) | B (moldability) | B (sound insulation) | B (moldability) |

TABLE 3

| Comparing items | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Skin material | Basis weight (g/m$^2$) | — | 45 | 650 | 220 | 220 | 220 | 220 |
| Viscoelastic material | Type | — | vinyl acetate | vinyl acetate | vinyl acetate | vinyl acetate | polyurethane | polyurethane |
| | Coating weight (g/m$^2$) | — | 400 | 400 | 95 | 650 | 250 | 250 |
| Air permeation amount of skin material (cc/cm × sec) | | — | 45 | 10 | 90 | 4 | 2 | 2 |
| Loss factor of skin material (tanδ)[1] | | — | 0.40 | 0.40 | 0.05 | 0.50 | 0.60 | 0.60 |
| Sound-absorbing material (PET) | Basis weight (g/m$^2$) | 1,000 | 1,000 | 1,000 | 1,000 | 1,000 | 190 | 2,100 |

TABLE 3-continued

| Comparing items | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Sound-absorbing material (urethane foam) | Basis weight (g/m²) | — | — | — | — | — | — | — |
| Sound-absorbing material (foamed EPDM) | Basis weight (g/m²) | — | — | — | — | — | — | — |
| Pressing conditions | Temperature (upper/lower ° C.) | — | (190/170) | (190/170) | (190/170) | (190/170) | (190/170) | (190/170) |
| | Pressure (Ion) | — | 120 | 120 | 120 | 120 | 120 | 120 |
| | Edge part thickness (mm) | — | 1 | 1 | 1 | 1 | 1 | 1 |
| Moldability | | — | C (break) | C (wrinkle) | A | C (mold adhesion) | C (edge peel) | B (wrinkle) |
| Strength at circumferential rim part (T-peel (N)) | | — | 5 | 20 | 19 | 19 | 6 | 21 |
| Area density (g/m²) | | 3,400 | 1,450 | 2,000 | 1,320 | 1,920 | 670 | 2,470 |
| Soundproof performance | Transmitted sound²⁾ (dB) | 72 | — | — | 95 | — | — | — |
| | Reflected sound³⁾ (dB) | 104 | — | — | 87 | — | — | — |
| | Total⁴⁾ (dB) | 104 | — | — | 96 | — | — | — |
| Overall judgment | | C (Standing wave) | C (moldability) | C (moldability) | C (sound insulation) | C (moldability) | C (moldability) | C (moldability) |

Notes:
1) It is a peak value of loss factor at 20 to 80° C., which is preferably 0.1 or more, more preferably 0.5.
2) A blank noise level is 100 dB.
3) A blank noise level is 90 dB.
4) It is the dB sum of the transmitted sound and the reverberating sound, the sum being an overall index of a soundproof effect.

As compared with the conventional soundproof covers wherein a rigid cover is bonded to a sound-absorbing material, the soundproof covers of Examples according to the invention have an equal or slightly inferior performance for the transmitted sound, but the reflected sound can be reduced to a large extent, so that it is realized that the soundproof covers are excellent in overall soundproof performance. Moreover, moldability is also satisfactory.

While the present invention has been described in detail and with reference to specific embodiments thereof, it will be apparent to one skilled in the art that various changes and modifications can be made therein without departing from the spirit and scope thereof.

This application is based on Japanese Patent Application No. 2007-094858 filed Mar. 30, 2007, and the contents thereof are herein incorporated by reference.

What is claimed is:

1. A soundproof cover comprising:
a sound-absorbing material having air permeability; and
a skin material impregnated with a viscoelastic material and having air permeability, wherein the viscoelastic material comprises a vinyl acetate, a vinyl acetate-ethylene copolymer resin, an acrylic resin, an acrylonitrile-styrene-butadiene copolymer resin, a silicone resin or a moisture-curable urethane resin, and wherein an amount of the viscoelastic material is applied to the skin material such that an air permeation amount of the skin material is 0.01 to 10 cc/cm²×sec.,
wherein the skin material is provided on a surface of the sound-absorbing material opposite to a sound source, and
wherein the soundproof cover has a three-dimensional shape corresponding to an outer shape of the sound source.

2. The soundproof cover according to claim 1, which has a thin flat part comprising a lamination of the sound-absorbing material and the skin material and being formed over a predetermined width of an outer circumference of the soundproof cover.

3. The soundproof cover according to claim 1, wherein the sound-absorbing material comprises a porous felt, a communicating resin foam, a communicating rubber foam, or an inorganic short fiber integrated body.

4. The soundproof cover according to claim 1, wherein the skin material comprises a woven fabric or a nonwoven fabric.

5. The soundproof cover according to claim 1, which is for automobiles or for industrial machines.

6. The soundproof cover according to claim 1, wherein the skin material has a basis weight of 50 to 600 g/cm².

* * * * *